United States Patent [19]
Kobayashi et al.

[11] Patent Number: 5,148,470
[45] Date of Patent: Sep. 15, 1992

[54] RADIO TELEPHONE APPARATUS HAVING AN INSTANTANEOUS CONVERSATION FUNCTION

[75] Inventors: Kazuo Kobayashi; Akio Toki; Koichi Ito; Hisanori Kuroki, all of Hino, Japan

[73] Assignee: Kabushiki Kaisha Toshiba, Kawasaki, Japan

[21] Appl. No.: 583,486

[22] Filed: Sep. 17, 1990

[30] Foreign Application Priority Data

Sep. 22, 1989 [JP] Japan .................................. 1-246885

[51] Int. Cl.$^5$ .......................................... H04M 11/10
[52] U.S. Cl. .......................................... 379/58; 379/61
[58] Field of Search ......................... 379/58, 61, 63

[56] References Cited

U.S. PATENT DOCUMENTS

| 4,910,761 | 3/1990 | Shimura et al. | 379/58 |
| 4,920,557 | 4/1990 | Umemoto | 379/61 |
| 4,969,205 | 11/1990 | Itoh | 379/61 |

Primary Examiner—James L. Dwyer
Assistant Examiner—Dwayne D. Bost
Attorney, Agent, or Firm—Finnegan, Henderson, Farabow, Garrett and Dunner

[57] ABSTRACT

A radio telephone apparatus including a base unit connected to a wire line and a radio telephone unit connected to the base unit via a radio communication link. The apparatus has an instantaneous conversation function for establishing a conversation state by detecting that the radio telephone unit has been lifted up in a standby state, and also has a talk commencing/terminating key allowing a command for commencing a conversation and a command for terminating the conversation to be inputted alternately. A time guard controlling circuit is also provided for invalidating an input operation of the talk commencing/terminating key if the talk commencing/terminating key is operated during a preset time. Simultaneously as the conversation state is established by lifting the radio telephone unit in the standby state, the preset timer is started, and even if the talk commencing/terminating key is pressed during the preset time of the timer, the input operation is invalidated and the conversation state is maintained.

13 Claims, 7 Drawing Sheets

RADIO TELEPHONE APPARATUS HAVING AN INSTANTANEOUS CONVERSATION FUNCTION

BACKGROUND OF THE INVENTION

1. Field of the Invention

The present invention relates to a radio telephone apparatus having a base unit and a radio telephone unit connected to the base unit via a radio communication link and to a method of controlling the same, and more particularly to a radio telephone apparatus having an instantaneous conversation function which makes it possible to effect a shift to a conversation state simply by lifting the radio telephone unit off a radio telephone unit-mounting base in a standby state.

2. Description of the Related Art

Conventionally, this type of radio telephone apparatus is arranged as shown in FIG. 6.

In FIG. 6, a base unit 1 is connected to a radio telephone unit 2 via a radio communication link and is also connected to a wire telephone line 3.

A signal transmitted from the wire telephone line 3 is inputted to a transmitter 5 via a hybrid circuit 4 so as to be subjected to modulation.

Radio waves modulated by the transmitter 5 are transmitted to the radio telephone unit 2 via a transmission antenna 6.

Meanwhile, the radio waves transmitted from the radio telephone unit 2 are received by a reception antenna 7 and are demodulated by a receiver 8, and are then transmitted to the wire telephone line 3 via the hybrid circuit 4.

A synthesizer 9 outputs a frequency corresponding to a radio channel to both the transmitter 5 and the receiver 8.

One output of the receiver 8 is inputted to a received electric field detecting circuit 10 so as to determine an electric field strength thereof.

This circuit is generally referred to a carrier squelch circuit or a noise squelch circuit.

In addition, another output of the receiver 8 is delivered as a data signal included in the received and demodulated waves, and is inputted to an identification signal detecting circuit 11 for collating an identification signal determined through a combination of the base unit 1 and the radio telephone unit 2, so as to undergo collation.

This identification signal is generally referred to as an ID code.

An output of the received electric field detecting circuit 10 and the demodulated output of the data signal are inputted to a control circuit 12 so as to be used for connection control.

Furthermore, the control circuit 12 effects other control such as control of the radio channel by controlling the synthesizer 9 as well as transmission of a transmission data signal to the transmitter 5 as an input for modulation.

Similarly, the radio telephone unit 2 is also provided with a reception antenna 13 and a receiver 14, and its modulated output is delivered to a telephone receiver 15.

In addition, voice inputted through a telephone transmitter 16 is inputted to a transmitter 17 so as to undergo modulation and is transmitted to the base unit 1 via a transmission antenna 18 in the form of radio waves.

A synthesizer 19, a received electric field detecting circuit 20, an identification signal detecting circuit 21 are arranged in the same way as those of the base unit 1, and a control circuit 22 effects the control of the radio telephone unit 2.

A speaker 23 is a sounder for issuing a ringing tone when an incoming call is received.

A talk commencing/terminating key 24 is so arranged that a command for commencing a conversation and a command for terminating the conversation can be inputted alternately each time it is pressed once.

A battery 25 is used as a power source for the radio telephone unit 2, and this battery 25 is charged by a charger 30 via a charging terminal 26. Here, the charger 30 functions as a base for mounting the radio telephone unit 2.

A charging detection circuit 27 is connected to a charging route for the battery 25 so as to detect whether the battery 25 is being charged or not, i.e., whether the radio telephone unit 2 is placed on the charger 30, i.e., the mounting base, or has been lifted off the charger 30, i.e., the mounting base.

With the above-described conventional radio telephone apparatus, when an incoming call is received by the base unit 1 via the wire telephone line 3 in a standby state, a ringing tone is issued from the speaker 23 of the radio telephone unit 2 or the base unit 1.

At this time, in the case of the radio telephone unit 2, it is possible to respond to the incoming call by pressing the talk commencing/terminating key 24.

In addition, it is also possible to respond to the call by lifting the radio telephone unit 2 off the charger 30.

The function whereby a conversation state can thus be established immediately upon lifting the radio telephone unit 2 off the charger 30 without pressing the talk commencing/terminating key 24 is called an instantaneous conversation function and is incorporated into many radio telephone apparatus today.

Accordingly, a brief description will be given of control of the instantaneous conversation function.

As described above, the charging detection circuit 27 detects a voltage at the charging terminal 26 which is in contact with the charger, and then outputs a detected result to the control circuit 22.

As a result, by monitoring the detected output of the charging detection circuit 27, the control circuit 22 is capable of ascertaining whether or not the radio telephone unit 2 is being charged.

Generally, in cases where a response to a call is made by lifting the radio telephone unit 2, at a point of time when the radio telephone unit 2 is lifted, the charging terminal 26 is disconnected from the charger, and the state of the radio telephone unit 2 shifts from that of being charged to that of not being charged.

Accordingly, the control circuit 22 may ascertain that a responding operation has been effected when the detected output of the charging detection circuit 27 has shifted from the state of being charged to that of not being charged. If a communication channel is formed at that time, a conversation state is established immediately, thereby making it possible to realize the aforementioned instantaneous conversation function.

FIG. 7 illustrates an example of the general operation of a conventional radio telephone apparatus having the instantaneous conversation function and the talk commencing/terminating key 24.

In FIG. 7, when the radio telephone unit 2 is in a standby state (Step 501), on the basis of the detected output of the charging detection circuit 27 the control circuit 22 determines whether the state of the radio telephone unit 2 has shifted from that of being charged to that of not being charged (Step 502).

Then, while the radio telephone unit 2 is being charged, the standby state is maintained, when the state has shifted to that of not being charged, the operation proceeds to a talking operation by means of the instantaneous conversation function (Step 503).

After the conversation state is thus established, the control circuit 22 determines whether or not the talk commencing/terminating key 24 has been pressed (Step 504).

Then, while the talk commencing/terminating key 24 is not being pressed, the conversation state is maintained, but when it is pressed, a talk terminating operation is effected immediately (Step 505) to return to the original standby state (Step 501).

With the conventional radio telephone apparatus controlled in the manner described above, no problem is presented when a response is made by pressing the talk commencing/terminating key 24 in the standby state. However, in cases where a response is made by lifting the radio telephone unit 2 by means of the instantaneous conversation function, there has been a danger of immediately resulting in the talk terminating operation if the talk commencing/terminating key 24 is pressed by mistake immediately after the conversation state is established.

Thus, with the above described conventional radio telephone apparatus, in cases where the instantaneous conversation function and the talk commencing/terminating key are used jointly, the call is terminated immediately if the talk commencing/terminating key is pressed by mistake immediately after the conversation state is established by means of the instantaneous conversation function. Hence, it has been necessary to pay utmost care not to erroneously operate the talk commencing/terminating key when the radio telephone unit is lifted, so that there has been the problem that the operating efficiency is bound to decline.

SUMMARY OF THE INVENTION

Accordingly, an object of the present invention is to provide a radio telephone apparatus which is capable of reducing the possibility of a call being terminated by an erroneous operation of a talk commencing/terminating key immediately after a conversation state is established by means of an instantaneous conversation function, and which is capable of securing the conversation state positively without paying any particular attention to the erroneous operation of the talk commencing/terminating key, thereby overcoming the above-described drawback of the conventional art.

To this end, in accordance with the present invention, there is provided a radio telephone apparatus including a base unit connected to a wire line and a radio telephone unit connected to the base unit via a radio communication link. The apparatus has an instantaneous conversation function for establishing a conversation state by detecting that the radio telephone unit has been lifted up in a standby state, and also has a talk commencing/terminating key allowing a command for commencing a conversation and a command for terminating the conversation to be inputted alternately. A time guard controlling circuit is also provided for invalidating an input operation of the talk commencing/terminating key if the talk commencing/terminating key is operated during a preset time after establishment of the conversation state by the means of the instantaneous conversation function.

With the radio telephone apparatus of this invention, simultaneously as the conversation state is established by lifting the radio telephone unit in the standby state, the preset timer is started, and even if the talk commencing/terminating key is pressed during the preset time of the timer, the input operation is invalidated and the conversation state is maintained.

By virtue of the time guard function, the conversation state is positively guaranteed during the time of the timer, so that it becomes unnecessary to pay particular attention to a possible erroneous operation of the talk commencing/terminating key at the time when the radio telephone unit is lifted by means of the instantaneous conversation function.

Thus, in accordance with the present invention, even when the talk commencing/terminating key is pressed by mistake immediately after the conversation state is established by means of the instantaneous conversation function, the conversation state can be maintained as it is. Hence, it is possible to substantially improve the operating efficiency as compared with a conventional apparatus in which the call is terminated instantaneously in the above-described situation, or for which it has been necessary to pay utmost attention to the possible erroneous operation of the talk commencing/terminating key when the radio telephone unit is lifted.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a detailed description will be given of the preferred embodiments of the present invention.

Figure 1:
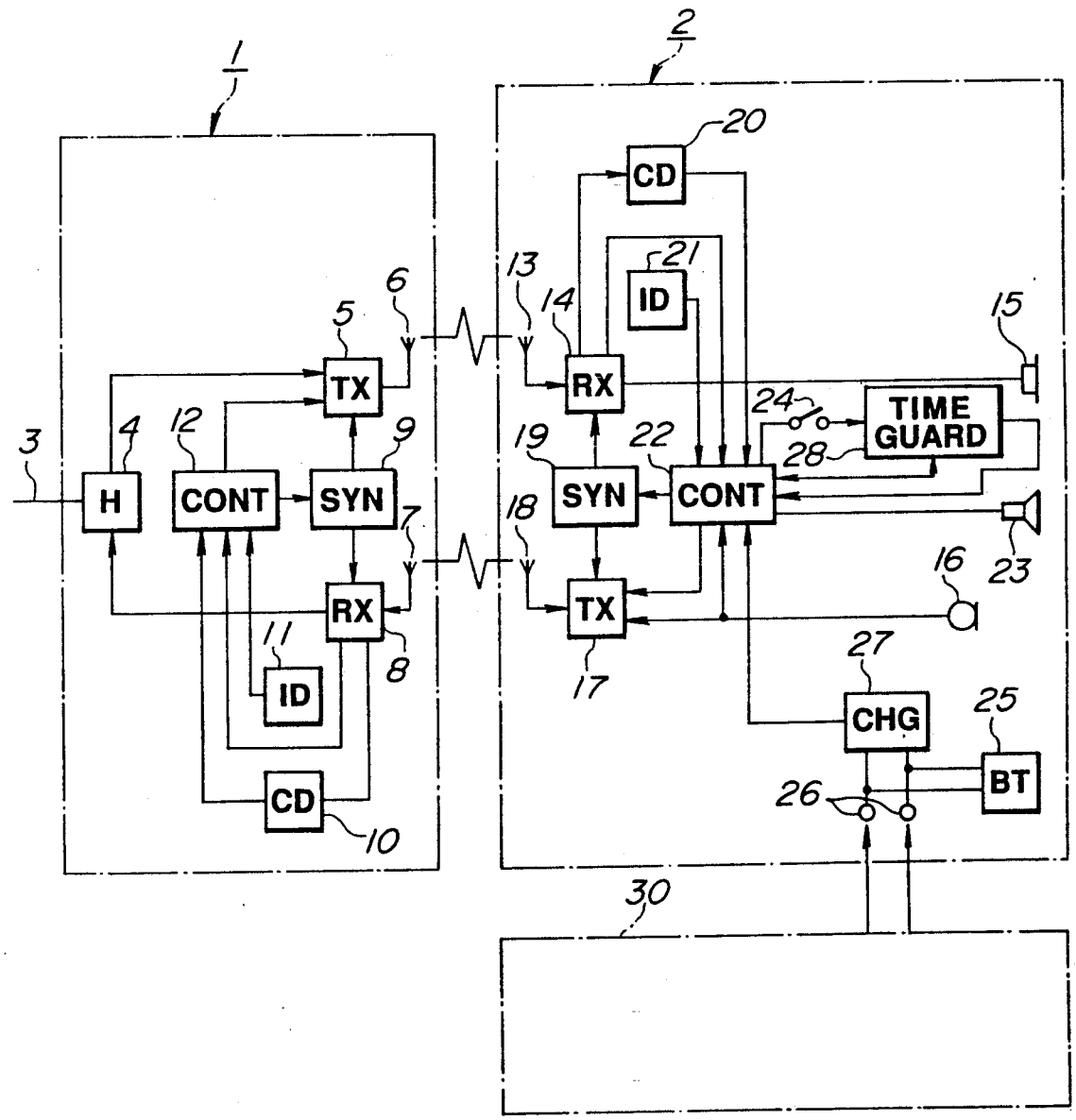
FIG. 1 is a block diagram illustrating an embodiment of a radio telephone apparatus in accordance with the present invention.

FIG. 1 is a block diagram illustrating an embodiment of a radio telephone apparatus in accordance with the present invention.

Figure 6:
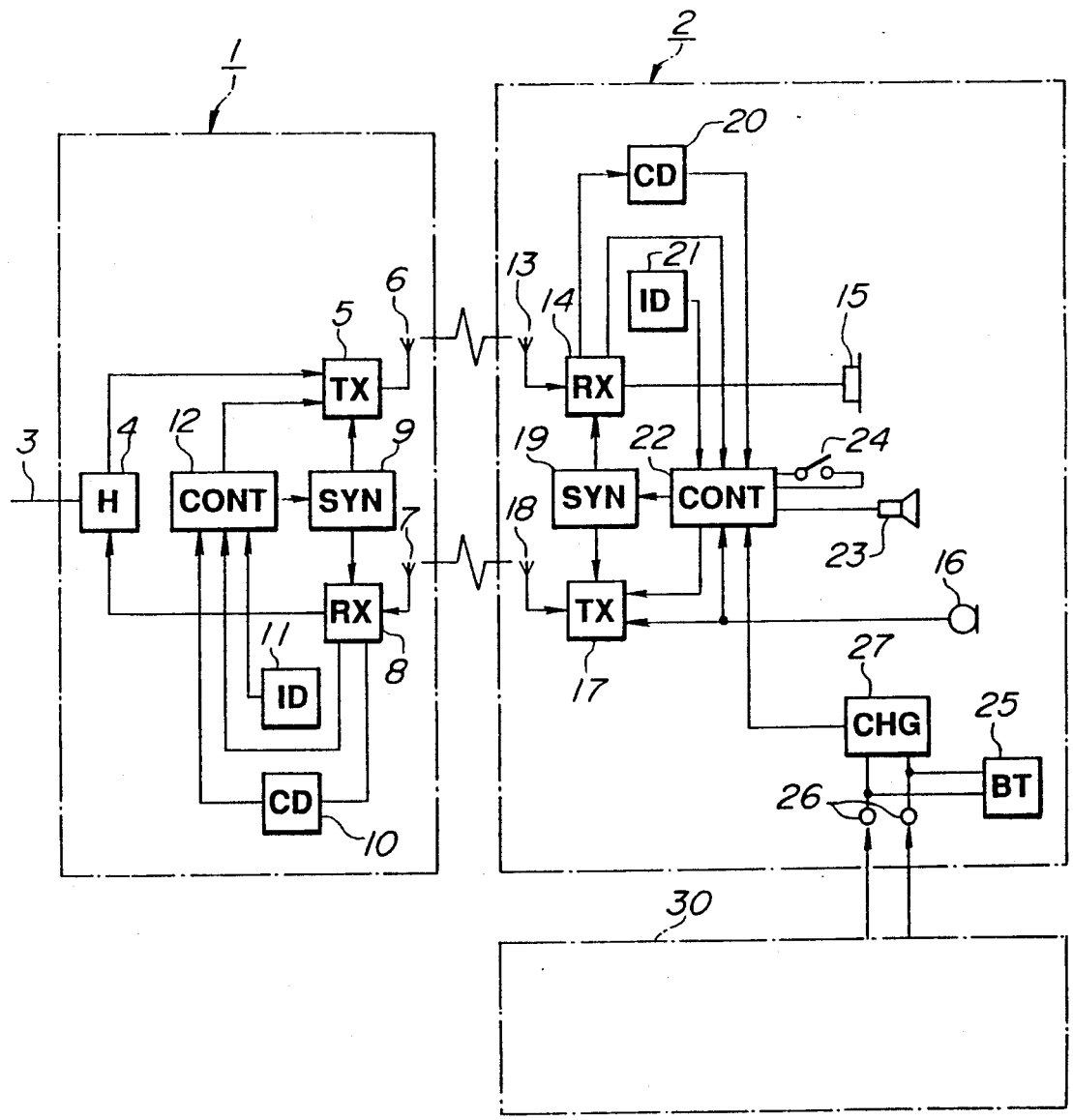
FIG. 6 is a block diagram illustrating a configuration of a conventional radio telephone apparatus of this type.
Figure 7:
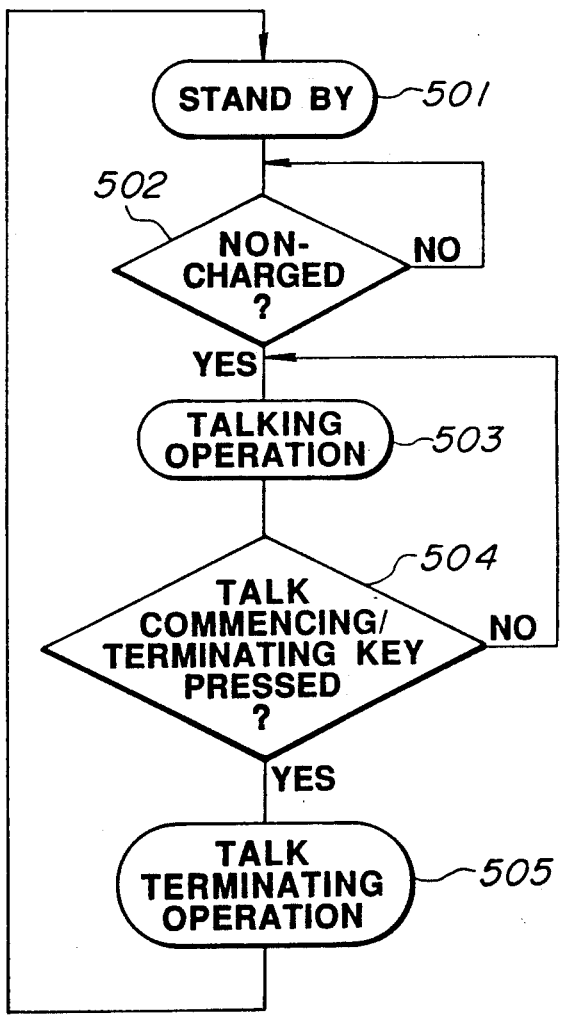
FIG. 7 is a flowchart illustrating an example of the operation of the conventional radio telephone apparatus.

In FIG. 1, a base unit 1 is arranged in the same way as the conventional unit shown in FIG. 6. That is, the base unit 1 is connected to a radio telephone unit 2 via a radio communication link, and is also connected to a wire telephone line 3. A signal transmitted from the wire telephone line 3 is inputted to a transmitter 5 via a hybrid circuit 4 so as to be subjected to modulation. Radio waves modulated by the transmitter 5 are transmitted to the radio telephone unit 2 via a transmission antenna 6.

Meanwhile, the radio waves transmitted from the radio telephone unit 2 are received by a reception antenna 7 and are demodulated by a receiver 8, and are then transmitted to the wire telephone line 3 via the hybrid circuit 4.

A synthesizer 9 outputs a frequency corresponding to a radio channel to both the transmitter 5 and the receiver 8.

One output of the receiver 8 is inputted to a received electric field detecting circuit 10 so as to determine an electric field strength thereof.

In addition, another output of the receiver 8 is delivered as a data signal included in the received and demodulated waves, and is inputted to an identification signal detecting circuit 11 for collating an identification signal determined through a combination of the base unit 1 and the radio telephone unit 2, so as to undergo collation.

An output of the received electric field detecting circuit 10 and the demodulated output of the data signal are inputted to a control circuit 12 so as to be used for connection control.

Furthermore, the control circuit 12 effects other control such as control of the radio channel by controlling the synthesizer 9 as well as transmission of a transmission data signal to the transmitter 5 as an input for modulation.

In addition, the radio telephone unit 2 is newly provided with a time guard circuit 28. In the same way as the prior art, included among other component elements of the radio telephone unit 2 are a reception antenna 13, a receiver 14, a telephone receiver 15, a telephone transmitter 16, a transmitter 17, a reception antenna 18, a synthesizer 19, a received electric field detecting circuit 20, an identification signal detecting circuit 21, a control circuit 22, a speaker 23, a talk commencing/terminating key 24, a battery 25, a charging terminal 26, and a charging detection circuit 27.

In the same way as the prior art, the radio telephone unit 2 thus arranged is provided with the instantaneous conversation function whereby the charging detection circuit 27 detects on the basis of a terminal voltage at the charging terminal 26 whether the radio telephone unit 2 is being charged or not, i.e., whether the radio telephone unit 2 is placed on the charger 30, and the control circuit 22 establishes a conversation state on the basis of a detected output obtained when the radio telephone unit 2 is lifted off the charger 30 and its state becomes that of not being charged.

Similarly, the conversation state can also be established for the ratio telephone unit 2 by pressing the talk commencing/terminating key 24.

This radio telephone unit 2 differs from the conventional one in that control is provided for invalidating the input operation of the talk commencing/terminating key 24 for a preset fixed time after the conversation state is established by the instantaneous conversation function.

Figure 2:
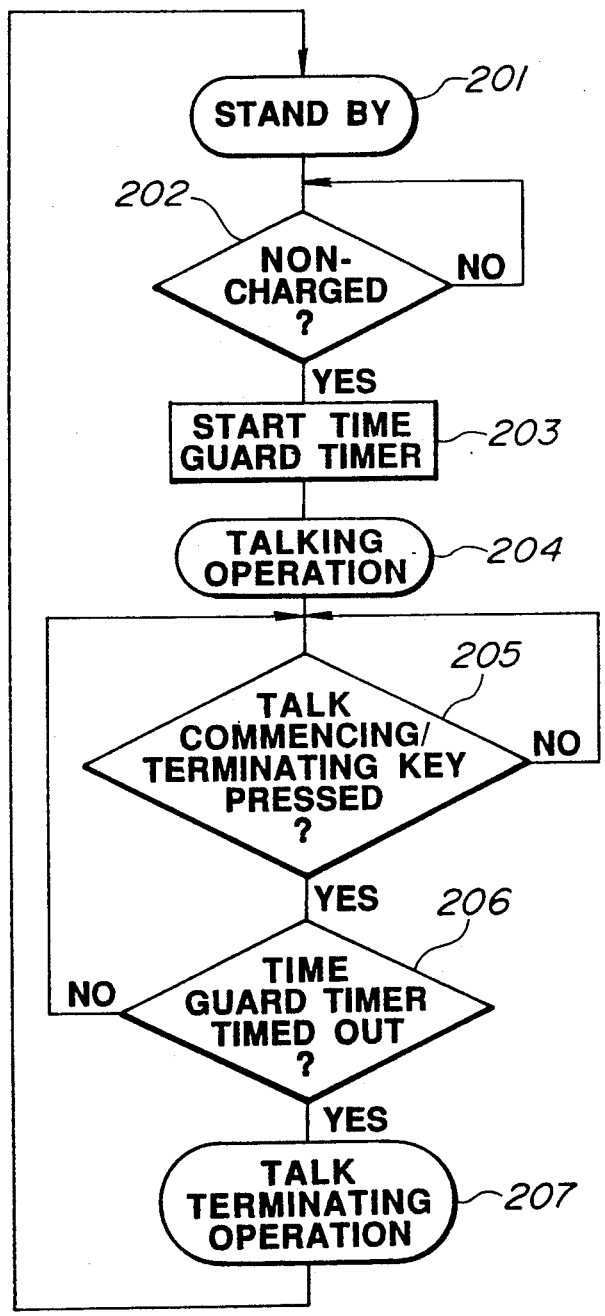
FIG. 2 is a flowchart illustrating an example of the operation of the embodiment shown in FIG. 1.

Referring now to the flowchart of FIG. 2, a detailed description will be given of how that control is effected.

Now, it is assumed that the radio telephone unit 2 is in a standby state (Step 201).

It is assumed that the following cases are included in this standby state: cases where a signal is being transmitted via the wire telephone line 3, cases where a call is received from the base unit 1 through a radio communication link as in the case of an extension call, cases where the radio telephone unit 2 is on standby for receiving such a signal or call, and cases where the radio telephone unit 2 is waiting for a call originating command in an attempt to establish the conversation state from the radio telephone unit 2 side.

In this standby state, the control circuit 22 detects on the basis of a detected output of the charging detection circuit 27 whether or not the radio telephone unit 2 is in the state of being charged by being mounted on the charger 30, or is in the state of not being charged after being lifted off the charger 30 (Step 202).

In this determination, if it is determined that the radio telephone unit 2 is being charged, the control circuit 22 maintains the standby state, but if it is determined that the radio telephone unit 2 is not being charged, the control circuit 22 starts a time guard timer in the time guard circuit 28 (Step 203), whereupon a communication channel is formed simultaneously, commencing a talking operation (Step 204).

It should be noted that although a description has been given of an example in which the talking operation is commenced after the time guard timer is started, an arrangement may be alternatively provided such that the time guard timer is started after the talking operation is commenced.

After the conversation state is thus established by means of the instantaneous conversation function, the control circuit 22 determines whether the talk commencing/terminating key 24 has been pressed (Step 205).

If it is thereby determined that the talk commencing/terminating key 24 has not been pressed, the conversation state is maintained as it is.

Meanwhile, if it is determined in Step 205 that the talk commencing/terminating key 24 has been pressed, the control circuit 22 then determines whether or not the aforementioned time guard timer has timed out (Step 206).

If the time guard timer has not timed out, the control circuit 22 invalidates the input operation of the talk commencing/terminating key 24 and continues to monitor whether or not the talk commencing/terminating key 24 is pressed, while maintaining the talking operation.

On the other hand, if the time guard timer has timed out, the input operation of the talk commencing/terminating key 24 is accepted so as to effect a talk terminating operation (Step 207), and the operation returns to the original standby state (Step 201).

Through such control, in this embodiment, even if the talk commencing/terminating key 24 is pressed by mistake immediately after the conversation state is established by means of the instantaneous conversation function, if it is within the time of the time guard timer, that operation is canceled, and the conversation state can be maintained positively.

Here, the time of the time guard timer can be set arbitrarily, and if a user effects an optimum time setting in correspondence with a situation where the radio telephone apparatus is used, more effective utilization becomes possible.

It should be noted that although in the above-described embodiment an example has been given in which the control circuit 22 is used to start the time guard timer and determine whether the time guard timer has timed out, various applications are conceivable as other examples, such as a method in which the detected output of the charging detection circuit 27 is directly inputted to the time guard circuit 28 so as to start the time guard timer, or a method in which the time guard circuit 28 itself determines whether the time guard timer has timed out.

Figure 3:
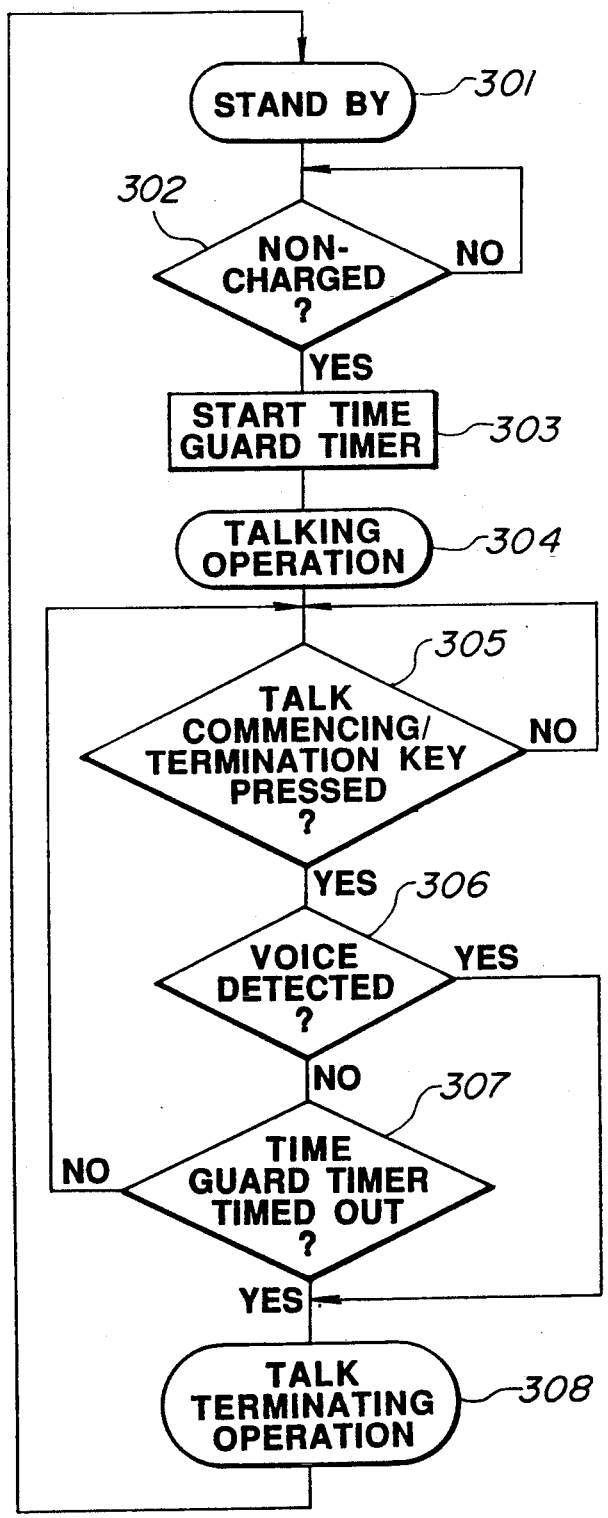
FIG. 3 is a flowchart illustrating another example of the operation of the embodiment shown in FIG. 1.

FIG. 3 illustrates another example of operation in which the pressing of the talk commencing/terminating key 24 is made effective even before the time guard timer times out upon detection of a voice input in the conversation state. That is, by the fact that voice has been inputted, it can be interpreted that an operator of the radio telephone unit 2 is aware that the radio telephone unit 2 has been set in the conversation state. In this state, it can be considered that the pressing of the talk commencing/terminating key 24 is not an erroneous operation.

In FIG. 3, when the radio telephone unit 2 is in the standby state (Step 301), if the state of the radio telephone unit 2 becomes that of not being charged in which it is lifted off the charger 30 (Step 302), the time guard timer in the time guard circuit 28 is started (Step 303), whereupon a communication channel is established simultaneously, thereby commencing the talking operation (Step 304).

After the conversation state is thus established by means of the instantaneous conversation function, a determination is made as to whether or not the talk commencing/terminating key 24 has been pressed (Step 305). If it is thereby determined that the talk commencing/terminating key 24 has been pressed, the control circuit 22 checks on the basis of an input from the telephone transmitter 16 whether or not there has been a voice input (Step 306). If there has already been a voice input, a determination is made that the pressing of the talk commencing/terminating key 24 is an operation for terminating a call, and the talk terminating operation is effected by accepting the input operation of the talk commencing/terminating key 24 (Step 308). The operation then returns to the original standby state (Step 301).

When it is determined in Step 306 that there has been no voice input, a determination is made as to whether or not the time guard timer has timed out (Step 307).

If the time guard timer has not timed out, the control circuit 22 invalidates the input operation of the talk commencing/terminating key 24 and continues to monitor whether or not the talk commencing/terminating key 24 is pressed, while maintaining the talking operation.

On the other hand, if the time guard timer has timed out, the input operation of the talk commencing/terminating key 24 is accepted so as to effect a talk terminating operation (Step 308), and the operation returns to the original standby state (Step 301).

In this arrangement, it is possible to terminate a call immediately after the conversation state has been established by means of the instantaneous conversation function, and it is possible to extend the time setting of the time guard timer to a certain degree, thereby positively preventing the erroneous operation of the talk commencing/terminating key 24.

Figure 4:
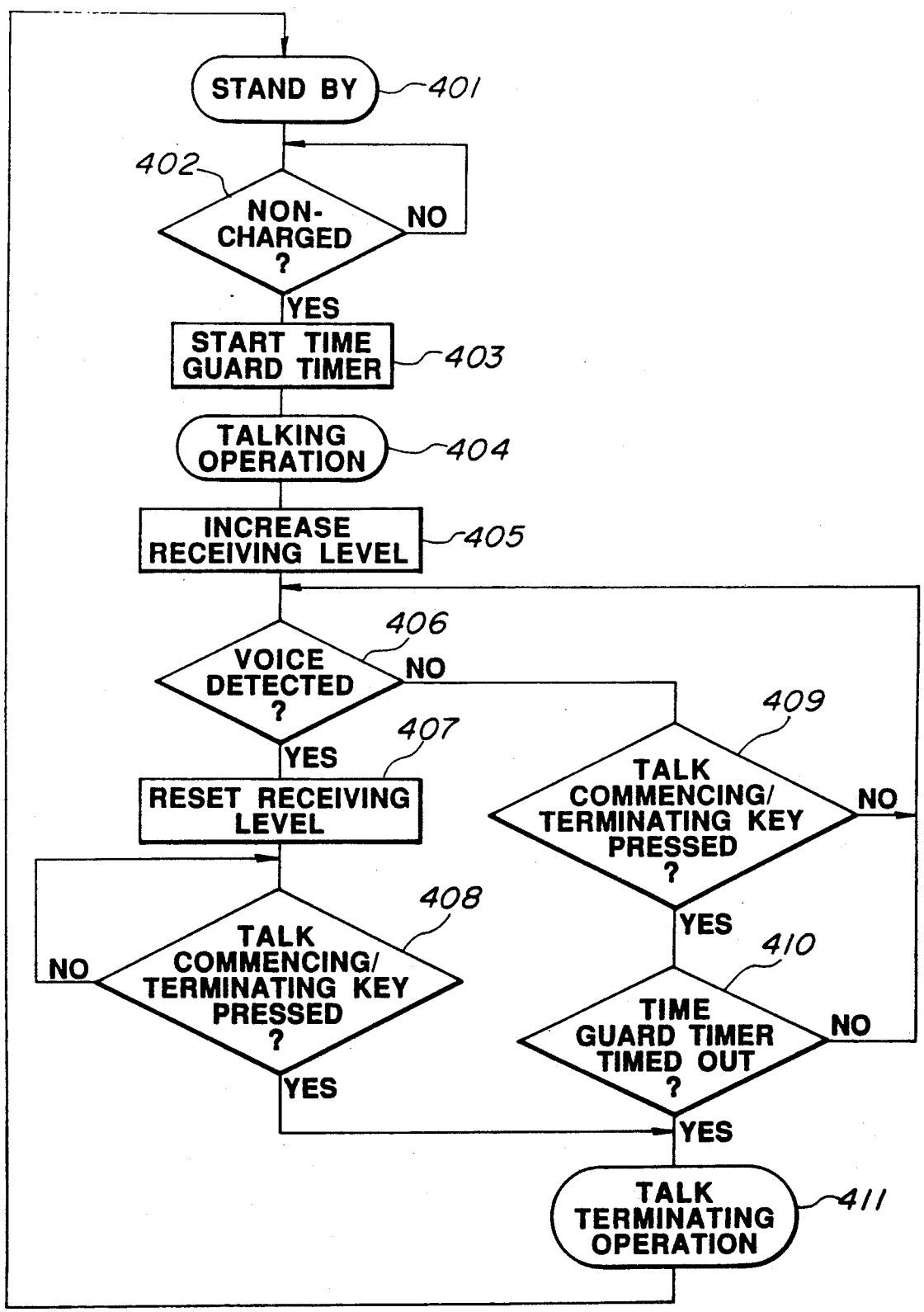
FIG. 4 is a flowchart illustrating still another example of the operation of the embodiment shown in FIG. 1.
Figure 5:
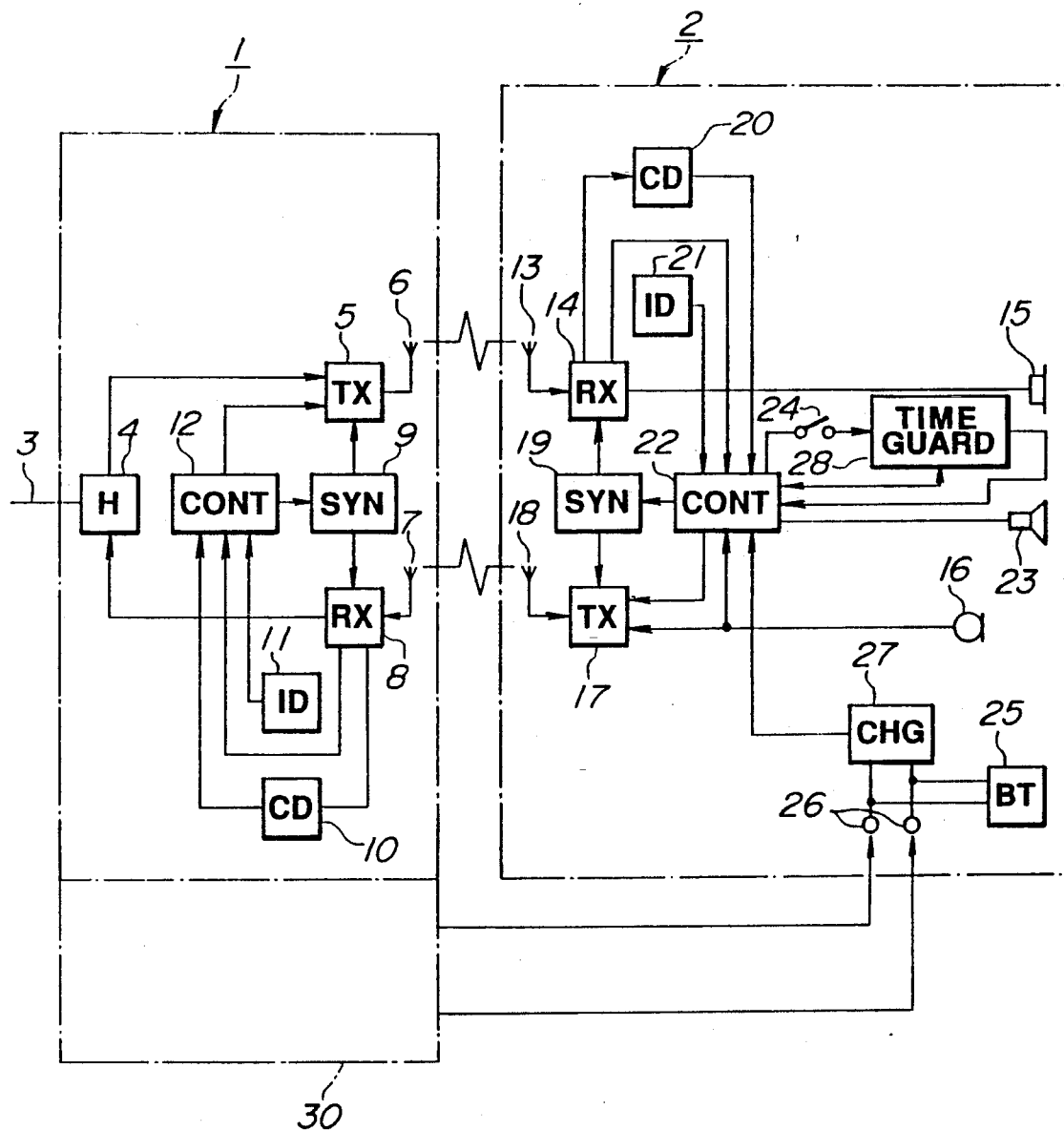
FIG. 5 is a block diagram illustrating another embodiment of the radio telephone apparatus in accordance with the present invention.

FIG. 4 illustrates still another example of operation in which the receiving voice level of the telephone receiver 15 is increased when the conversation state is established by means of the instantaneous conversation function. By adopting this arrangement, it is possible to aurally inform a user of the radio telephone unit 2 of the fact that the conversation state has been established by means of the instantaneous conversation function. As a result, it is possible to prevent the erroneous operation of the talk commencing/terminating key 24.

In FIG. 4, when the radio telephone unit 2 is in the standby state (Step 401), if the state of the radio telephone unit 2 becomes that of not being charged in which it is lifted off the charger 30 (Step 402), the time guard timer in the time guard circuit 28 is started (Step 403), whereupon a communication channel is established simultaneously, thereby commencing the talking operation (Step 404).

In this embodiment, when the conversation state is established by means of the instantaneous conversation function, the receiving voice level of the telephone receiver 15 is increased by a predetermined value through control by the control circuit 22 (Step 405). As a result, the user of the radio telephone unit 2 is aurally able to ascertain that the radio telephone unit 2 has been set in the conversation state. Then, the control circuit 22 checks on the basis of an input from the telephone transmitter 16 whether there has been a voice input (Step 406), and if there has been the voice input, the receiving voice level is returned to the original level through control by the control circuit 22 (Step 407). If the talk commencing/terminating key 24 is pressed in this state (Step 408), it is determined that the pressing of the talk commencing/terminating key 24 is an operation for terminating a call, and the input operation of the talk commencing/terminating key 24 is accepted so as to effect a talk terminating operation (Step 411), and the operation returns to the original standby state (Step 401).

If voice is not detected in Step 406, a determination is made as to whether or not the talk commencing/terminating key 24 has been pressed (Step 409). If it is judged that the talk commencing/terminating key 24 has been pressed, a determination is then made as to whether or not the time guard timer has timed out (Step 410). If the time guard timer has not timed out, the input operation of the talk commencing/terminating key 24 is made invalid, the operation returns to Step 406, and the control circuit 22 continues to monitor the voice input and whether or not the talk commencing/terminating key 24 is pressed, while maintaining the talking operation.

On the other hand, if it is determined in Step 410 that the time guard timer has timed out, the input operation of the talk commencing/terminating key 24 is accepted so as to effect the talk terminating operation (411), and the operation returns to the original standby state (Step 401).

It should be noted that although in the above-described embodiments a description has been given of a type in which the charger 30 is formed separately from the base unit 1, i.e., an independent type, an arrangement may be alternatively provided such that the charger 30 is provided integrally on the base unit 1.

The means for detecting the lifting of the radio telephone unit 2 is not restricted to the aforementioned one for monitoring the charging state, and it is conceivable to employ a mechanical switch, an optically detecting method, or the like.

Furthermore, although the present invention is applicable to both call originating and call receiving, it goes without saying that a substantial advantage can be expected even if the invention is restricted only to call receiving.

What is claimed is:

1. A radio telephone apparatus comprising:
   a base unit connected to a wire line;
   a radio telephone unit connected to said base unit via a radio communication link;
   mounting means for mounting said radio telephone unit thereon;
   detecting means for detecting that said radio telephone unit has been lifted off said mounting means;
   a talk commencing/terminating key for inputting a command for commencing a conversation when said talk commencing/terminating key is operated in a standby state and for inputting a command for terminating the conversation when said talk commencing/terminating key is operated in a conversation state;
   means for establishing the conversation state by means of a detected output of said detecting means in the standby state or by an input of a conversation commencing command through the operation of said talk commencing/terminating key; and
   time guard means for invalidating an input operation of said talk commencing/terminating key during a preset time if the conversation state is established through a detected output of said detecting means in the standby state.

2. A radio telephone apparatus according to claim 1, wherein said radio telephone unit has a rechargeable battery, and said mounting means has charging means for charging said battery of said radio telephone unit with said radio telephone unit mounted on said mounting means.

3. A radio telephone apparatus according to claim 1, wherein, on the basis of a fact that said radio telephone unit has shifted from a charging state to a non-charging state, said detecting means detects that said radio telephone unit has been lifted off said mounting means.

4. A radio telephone apparatus according to claim 1, wherein said time guard means comprises:
   timer means for commencing counting on the basis of the detected output of said detecting means and for counting said predetermined preset time; and
   means for invalidating an input through the operation of said talk commencing/terminating key while said timer means is counting the time.

5. A radio telephone apparatus according to claim 1, wherein said mounting means is formed separately from said base unit.

6. A radio telephone apparatus according to claim 1, wherein said mounting means is formed integrally with said base unit.

7. A radio telephone apparatus according to claim 1, further comprising:
   voice input detecting means for detecting an input of voice in the conversation state; and
   means for canceling the operation of said time guard means through the detected output of said voice input detecting means.

8. A radio telephone apparatus according to claim 1, further comprising:
   receiving-voice-level controlling means for increasing a received level when the conversation state is established through the detected output of said detecting means in the standby state.

9. A radio telephone apparatus according to claim 1, further comprising:
   voice input detecting means for detecting an input of voice in the conversation state; and
   means for returning to an original level the receiving-voice-level increased through the detected output of said voice input detecting means.

10. A radio telephone apparatus comprising:
    a base unit connected to a wire line;
    a radio telephone unit connected to said base unit via a radio communication link;
    mounting means for mounting said radio telephone unit thereon;
    detecting means for detecting that said radio telephone unit has been lifted off said mounting means;
    a talk commencing/terminating key for inputting a command for commencing a conversation when said talk commencing/terminating key is operated in a standby state and for inputting a command for terminating the conversation when said talk commencing/terminating key is operated in a conversation state;
    means for establishing the conversation state by means of a detected output of said detecting means in the standby state or by an input of a conversation commencing command through the operation of said talk commencing/terminating key;
    time guard means for invalidating an input operation of said talk commencing/terminating key during a preset time if the conversation state is established through the detected output of said detecting means in the standby state;
    voice input detecting means for detecting an input of voice in the conversation state;
    means for canceling the operation of said time guard means through the detected output of said voice input detecting means;
    receiving-voice-level controlling means for increasing a receiving level when the conversation state is established through the detection output of said detecting means in the standby state; and
    means for returning to an original level the receiving level increased through the detected output of said voice input detecting means.

11. A radio telephone apparatus according to claim 10, wherein said radio telephone unit has a rechargeable battery, and said mounting means has charging means for charging said battery of said radio telephone unit with said radio telephone unit mounted on said mounting means.

12. A radio telephone apparatus according to claim 10, wherein, on the basis of a fact that said radio telephone unit has shifted from a charging state to a non-charging state, said detecting means detects that said radio telephone unit has been lifted off said mounting means.

13. A method for controlling a radio telephone apparatus including a base unit connected to a wire line; a radio telephone unit connected to said base unit via a radio communication link; mounting means for mounting said radio telephone unit thereon; detecting means for detecting that said radio telephone unit has been lifted off said mounting means; a talk commencing/terminating key for inputting a command for commencing a conversation when said talk commencing/terminating key is operated in a standby state and for inputting a command for terminating the conversation when said talk commencing/terminating key is operated in a conversation state; and means for establishing the conversation state by means of a detected output of said detecting means in the standby state or by an input of a conversation commencing command through the operation of said talk commencing/terminating key, said method comprising the steps of:

counting a preset time if the conversation state is established through the detected output of said detecting means in the standby state;

monitoring the operation of said talk commencing-/terminating key during the counting; and invalidating the operation of said talk commencing-/terminating key if said talk commencing/terminating key is operated during the counting.

* * * * *